United States Patent
Chan

(10) Patent No.: US 12,434,164 B2
(45) Date of Patent: Oct. 7, 2025

(54) TOY FIGURE MANUFACTURING

(71) Applicant: Hasbro, Inc., Pawtucket, RI (US)

(72) Inventor: Stanley Chan, Tai Koo (HK)

(73) Assignee: Hasbro, Inc., Pawtucket, RI (US)

( * ) Notice: Subject to any disclaimer, the term of this patent is extended or adjusted under 35 U.S.C. 154(b) by 466 days.

(21) Appl. No.: 17/776,858

(22) PCT Filed: Nov. 11, 2020

(86) PCT No.: PCT/US2020/059924
§ 371 (c)(1),
(2) Date: May 13, 2022

(87) PCT Pub. No.: WO2021/096904
PCT Pub. Date: May 20, 2021

(65) Prior Publication Data
US 2022/0387900 A1    Dec. 8, 2022

Related U.S. Application Data

(60) Provisional application No. 62/936,132, filed on Nov. 15, 2019.

(51) Int. Cl.
*A63H 9/00*        (2006.01)
*B29C 64/393*      (2017.01)
(Continued)

(52) U.S. Cl.
CPC .............. *A63H 9/00* (2013.01); *B29C 64/393* (2017.08); *B41J 3/40731* (2020.08); *B33Y 50/02* (2014.12)

(58) Field of Classification Search
CPC .......... A63H 9/00; B33Y 40/20; B33Y 50/00; B33Y 50/02; B33Y 80/00; B33Y 99/00;
(Continued)

(56) References Cited

U.S. PATENT DOCUMENTS 4,659,319 A    4/1987   Blair
4,876,758 A    10/1989  Rolloff et al.
(Continued)

FOREIGN PATENT DOCUMENTS

BR    102016008861 A2   10/2017
CN        201271497 Y    7/2009
(Continued)

OTHER PUBLICATIONS

Chinese Intellectual Property Office, Application No. 202080093242.3, Notification of Second Office Action, issued Jul. 10, 2024, 11 pages total.
(Continued)

*Primary Examiner* — Leslie J Evanisko
*Assistant Examiner* — Thomas Ray Knief
(74) *Attorney, Agent, or Firm* — DiBerardino McGovern IP Group LLC

(57) ABSTRACT

An inkjet printing system includes: a production apparatus configured to receive an original body template and to produce a three-dimensional body based on the original body template; a metrology apparatus configured to receive the produced three-dimensional body from the production apparatus and to topographically scan the received three-dimensional body to thereby produce an updated body template of the three-dimensional body; a control apparatus in communication with the metrology apparatus; and an inkjet printing apparatus. The control apparatus is configured to receive the updated body template and to create a topographical printing design based on the updated body template. The inkjet printing apparatus is in communication with the control apparatus, and is configured to receive the three-dimensional body and apply the created topographical printing design to the three-dimensional body.

21 Claims, 11 Drawing Sheets

(51) Int. Cl.
*B33Y 50/02* (2015.01)
*B41J 3/407* (2006.01)

(58) Field of Classification Search
CPC ......... B41F 17/30; B29C 64/00; B29C 64/30; B29C 64/40; B29C 64/386; B29C 64/393; B29C 64/10; B41J 3/407; B41J 3/4073; B41J 3/40731
See application file for complete search history.

(56) References Cited

U.S. PATENT DOCUMENTS

| | | | |
|---|---|---|---|
| 4,892,501 | A | 1/1990 | Girelli |
| 4,929,213 | A | 5/1990 | Morgan |
| 4,993,987 | A | 2/1991 | Hull et al. |
| 5,009,626 | A | 4/1991 | Katz |
| 5,280,305 | A | 1/1994 | Monroe et al. |
| 5,314,370 | A | 5/1994 | Flint |
| 5,382,187 | A | 1/1995 | Wilson |
| 5,641,448 | A | 6/1997 | Yeung et al. |
| 5,736,201 | A * | 4/1998 | Flint ............... B44C 5/06 427/256 |
| 5,746,952 | A | 5/1998 | Marshall |
| 5,803,788 | A | 9/1998 | Penberthy |
| 6,042,759 | A | 3/2000 | Marshall |
| 6,220,689 | B1 | 4/2001 | Sturgeon |
| 6,233,499 | B1 | 5/2001 | Matsumoto |
| 6,403,003 | B1 | 6/2002 | Fekete et al. |
| 6,460,958 | B2 * | 10/2002 | Kubo ............... B41J 3/4073 347/2 |
| 6,945,841 | B2 | 9/2005 | Becker et al. |
| 7,006,952 | B1 | 2/2006 | Matsumoto et al. |
| 7,054,701 | B2 | 5/2006 | Shimizu et al. |
| 7,255,821 | B2 | 8/2007 | Priedeman, Jr. et al. |
| 7,407,250 | B2 | 8/2008 | Jones et al. |
| 7,526,360 | B2 | 4/2009 | Oshitani et al. |
| 7,840,443 | B2 | 11/2010 | Lukis et al. |
| 7,887,729 | B2 | 2/2011 | Tye et al. |
| 8,162,712 | B1 | 4/2012 | Uy |
| 8,463,584 | B2 | 6/2013 | Yu |
| 8,655,481 | B2 | 2/2014 | Sheu |
| 8,812,270 | B2 | 8/2014 | Li et al. |
| 8,834,228 | B2 | 9/2014 | Marine |
| 8,874,251 | B2 | 10/2014 | Thornton |
| 9,266,353 | B2 | 2/2016 | Beier et al. |
| 9,370,900 | B2 | 6/2016 | Ohnishi et al. |
| 9,403,099 | B2 | 8/2016 | Tye et al. |
| 9,504,925 | B2 | 11/2016 | Lauer |
| 9,649,856 | B2 | 5/2017 | Lindner et al. |
| 9,878,533 | B2 | 1/2018 | Sonnauer |
| 10,899,142 | B2 * | 1/2021 | Amir ............... B41J 3/4073 |
| 2001/0003871 | A1 | 6/2001 | Patton et al. |
| 2004/0240730 | A1 | 12/2004 | Rinehart |
| 2005/0200043 | A1 | 9/2005 | Leu et al. |
| 2006/0003111 | A1 | 1/2006 | Tseng |
| 2012/0232857 | A1 | 9/2012 | Fisker et al. |
| 2014/0043329 | A1 | 2/2014 | Wang et al. |
| 2014/0319734 | A1 | 10/2014 | Voit et al. |
| 2016/0073719 | A1 | 3/2016 | Barad |
| 2016/0349738 | A1 * | 12/2016 | Sisk ............... G05B 19/4097 |
| 2017/0203220 | A1 | 7/2017 | Lauer |
| 2018/0015379 | A1 * | 1/2018 | Pratt ............... A63H 9/00 |
| 2018/0056199 | A1 | 3/2018 | Nishio et al. |
| 2018/0218531 | A1 | 8/2018 | Sparks |
| 2018/0243948 | A1 | 8/2018 | Matzner et al. |
| 2018/0281458 | A1 * | 10/2018 | Johnson ............... B29C 51/421 |

FOREIGN PATENT DOCUMENTS

| | | |
|---|---|---|
| CN | 101676113 A | 3/2010 |
| CN | 101825456 B | 1/2012 |
| CN | 203994718 U | 12/2014 |
| CN | 105478764 A | 4/2016 |
| CN | 106327571 A | 1/2017 |
| JP | H11156057 A | 6/1999 |
| JP | 2000024330 A | 1/2000 |
| JP | 2001243538 A | 9/2001 |
| JP | 2002019087 A | 1/2002 |
| JP | 2004291097 A | 10/2004 |
| JP | 2004362540 A | 12/2004 |
| JP | 3622543 B2 | 2/2005 |
| JP | 2005088390 A | 4/2005 |
| JP | 2005110820 A | 4/2005 |
| JP | 2008062634 A | 3/2008 |
| JP | 2008148974 A | 7/2008 |
| JP | 4192769 B2 | 12/2008 |
| JP | 4597600 B2 | 12/2010 |
| JP | 2016175358 A | 10/2016 |
| KR | 100454440 B1 | 10/2004 |
| KR | 20060021767 A | 3/2006 |
| KR | 20060021768 A | 3/2006 |
| KR | 101509046 B1 | 3/2015 |
| WO | 9749471 A1 | 12/1997 |
| WO | 200183064 A1 | 11/2001 |
| WO | 2004007203 A1 | 1/2004 |
| WO | 2008056521 A1 | 5/2008 |
| WO | 2014024810 A1 | 2/2014 |
| WO | 2016063090 A1 | 4/2016 |
| WO | 2017053850 A2 | 3/2017 |
| WO | 2018073822 A1 | 4/2018 |

OTHER PUBLICATIONS

Chinese Intellectual Property Office, Application No. 202080093242.3, Notification of First Office Action, issued Jan. 2, 2024, 25 pages total.
Korean Intellectual Property Office, International Search Report and Written Opinion, counterpart PCT Application No. PCT/US2020/059924, mailed Mar. 12, 2021, 12 pages total.

* cited by examiner

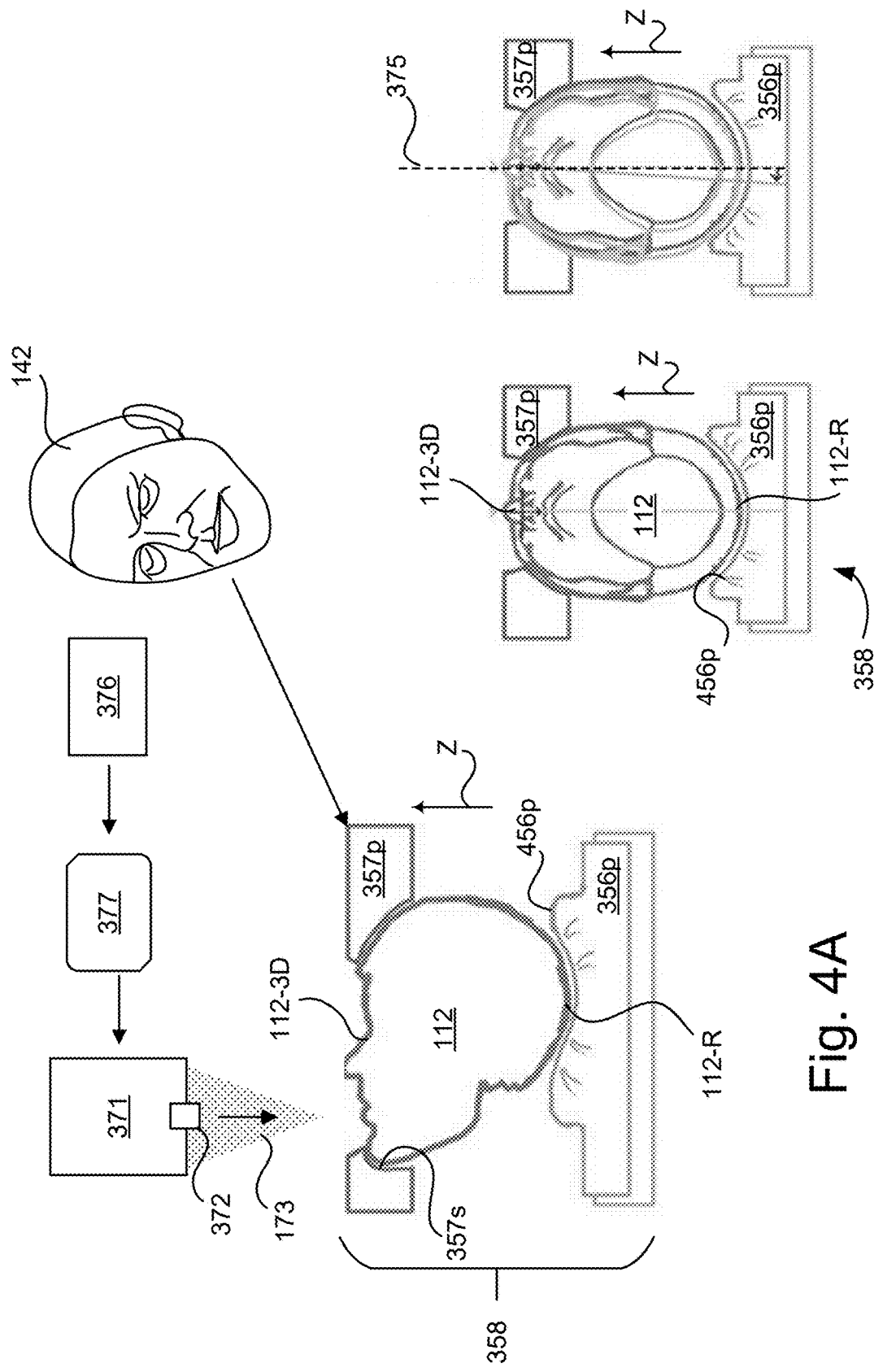

TOY FIGURE MANUFACTURING

CROSS REFERENCE TO RELATED APPLICATION

This application claims priority to U.S. Application No. 62/936,132, filed Nov. 15, 2019, which is incorporated herein by reference in its entirety.

TECHNICAL FIELD

This disclosure relates to inkjet printing apparatus and system configured to make a three-dimensional body, such as a head of a toy figure that has an appearance of an animal or human, and to decorate the three-dimensional body with a design. For example, the face of a human can be created using the described inkjet printing apparatus and system, including forming three-dimensional contours on the face and applying features to the three-dimensional contours.

BACKGROUND

Dolls and action figures can be customized to resemble particular people. Technology including scanners and three-dimensional printers can be used for customized heads and bodies. Facial features can be printed onto the head by using ink jets.

SUMMARY

In some general aspects, a method of printing on a three-dimensional body is described. The method includes: receiving a three-dimensional body that has been formed based on an original body template; topographically scanning a printing region of the received three-dimensional body; producing an updated body template of the printing region of the three-dimensional body based on the topographical scanning; creating a topographical printing design based on the updated body template; and applying the created topographical printing design to the printing region of the three-dimensional body.

Implementations can include one or more of the following features. For example, the updated body template of the three-dimensional body can be produced based on the topographical scanning by determining a datum plane of the printing region and an orientation of the datum plane.

The topographical printing design can be created based on the updated body template by creating a two-dimensional printing design that accounts for three-dimensional features of the printing region of the three-dimensional body.

The method can further include fixing the three-dimensional body with a fixture apparatus relative to a nozzle through which ink is delivered to thereby apply the created topographical printing design to the printing region of the three-dimensional body. The method can also include, prior to fixing the three-dimensional body with the fixture apparatus, creating the fixture apparatus based on the updated body template. The fixture apparatus can be created by building a guide plate configured to attach to a base plate such that a body volume is defined between the attached base plate and the guide plate, in which the guide plate includes a printing opening. The guide plate can be built by forming an interacting region of the guide plate to complement a front region of the three-dimensional body, the front region enclosing the printing region of the three-dimensional body. The three-dimensional body can be fixed with the fixture apparatus by sandwiching the three-dimensional body between the base plate and the guide plate in the body volume such that the printing region of the three-dimensional body is exposed through the printing opening. The three-dimensional body can be fixed with the fixture apparatus by contacting the guide plate with a front region of the three-dimensional body, the front region enclosing the printing region.

The created topographical printing design can be applied to the three-dimensional body by projecting ink toward the three-dimensional body through one or more nozzles in accordance with the topographical printing design.

The created topographical printing design can be applied to the printing region of the three-dimensional body by controlling a distance between a guide plate that is in contact with a front region of the three-dimensional body and one or more nozzles. The front region of the three-dimensional body defines and encloses a printing region that is exposed to the one or more nozzles through a printing opening of the guide plate.

In other general aspects, an inkjet printing system includes: a production apparatus configured to receive an original body template and to produce a three-dimensional body based on the original body template; a metrology apparatus configured to receive the produced three-dimensional body from the production apparatus and to topographically scan the received three-dimensional body to thereby produce an updated body template of the three-dimensional body; a control apparatus in communication with the metrology apparatus, the control apparatus configured to receive the updated body template and to create a topographical printing design based on the updated body template; and an inkjet printing apparatus in communication with the control apparatus, and configured to receive the three-dimensional body and apply the created topographical printing design to the three-dimensional body.

Implementations can include one or more of the following features. For example, the inkjet printing apparatus can include a nozzle configured to project ink in accordance with the created topographical printing design. The inkjet printing apparatus can include a fixture apparatus configured to fix the three-dimensional body relative to the nozzle. The fixture apparatus can include a guide plate and a base plate, the guide plate and base plate able to be connected to define a body volume and the guide plate defines a printing opening and the guide plate is shaped based on the updated body template. The guide plate can have a geometric shape that is complementary to a front region of the three-dimensional body, the front region enclosing a printing region to which the ink is applied.

In other general aspects, an inkjet printing apparatus includes: an ink supply apparatus including one or more reservoirs for storing ink and one or more nozzles, each nozzle defining an opening at a first end in fluid communication with at least one of the reservoirs and at a second end aligned with a target printing region; and a fixture apparatus configured to interact with the target printing region. The fixture apparatus includes: a base plate; a guide plate configured to be connected to the base plate, the guide plate facing one or more nozzles when the fixture apparatus encompasses the target printing region; and one or more sub-fixtures. Each sub-fixture is defined by a respective and aligned portion of the guide plate and the base plate. Each guide plate portion has a topographical shape that is complementary with a front region of a three-dimensional body and each guide plate portion defines a printing opening that is larger than a printing region defined within the front region of the three-dimensional body.

Implementations can include one or more of the following features. For example, each three-dimensional body can be fixed between a base plate portion and the guide plate portion when the guide plate and the base plate are attached to each other and the printing region of each three-dimensional body is exposed by way of the printing opening of the guide plate portion.

The nozzle can be configured to project ink from one or more reservoirs toward the target region in accordance with a topographical printing design that is based on a topographical shape of the three-dimensional body.

The inkjet printing apparatus can also include a control system in communication with the ink-supply apparatus, the control system configured to control one or more properties of the ink emitted from the one or more nozzles based on a topographical printing design.

In use, each guide plate portion can be in contact with the front region of the three-dimensional body and a distance between the guide plate portion and one or more nozzles can be controlled.

The inkjet printing apparatus can also include a fixture manufacturing device configured to receive information about the topographical shape of the three-dimensional body after the three-dimensional body is produced and to adjust a geometry of the guide plate portion based on this received information so that the guide plate portion has a tighter interface with the three-dimensional body when the three-dimensional body is fixed in the fixture apparatus.

While using inkjet printing to decorate three-dimensional region (such as a face), the paint or ink is applied to the entire face in a single operation, and dozens of heads can be printed at any one time. Because of this, inkjet printing demands a very accurate placement and orientation of the heads relative to the inkjet nozzle during printing. Moreover, before the inkjet printing even begins, each head may be subjected to non-uniform shrinkage or clinging during injection molding, and this causes slight and inconsistent deformations in the heads. In prior inkjet printing apparatuses and methods, such deformations could cause misaligned face decorations and a high percentage of defective faces. Also, the described inkjet printing apparatus, system, and method takes into account the deformations present in the head that could impact the placement of the printed features on the face. In some aspects, the head is placed in a fixture by registering the front (as opposed to the back or rear) of the head with the fixture.

Some of the aspects of the inkjet printing apparatus, system, and method may be more suitable for heads of a particular size, for example, heads for use on toy figures that are less than 6" tall. While other of the aspects may be more suitable for heads for use on toy figures that are greater than 6" tall.

DESCRIPTION OF DRAWINGS

FIG. 4A is a block diagram an implementation of the inkjet printing apparatus of FIG. 1 including a side cross-sectional view of an implementation of a fixture apparatus for receiving and holding a three-dimensional body;

FIG. 4B is a side cross-sectional view of the implementation of the fixture apparatus of FIG. 4A;

FIG. 4C is a side cross-sectional view of the implementation of the fixture apparatus of FIG. 4B, showing effective mating between the three-dimensional body and the fixture apparatus;

DETAILED DESCRIPTION

Figure 1:
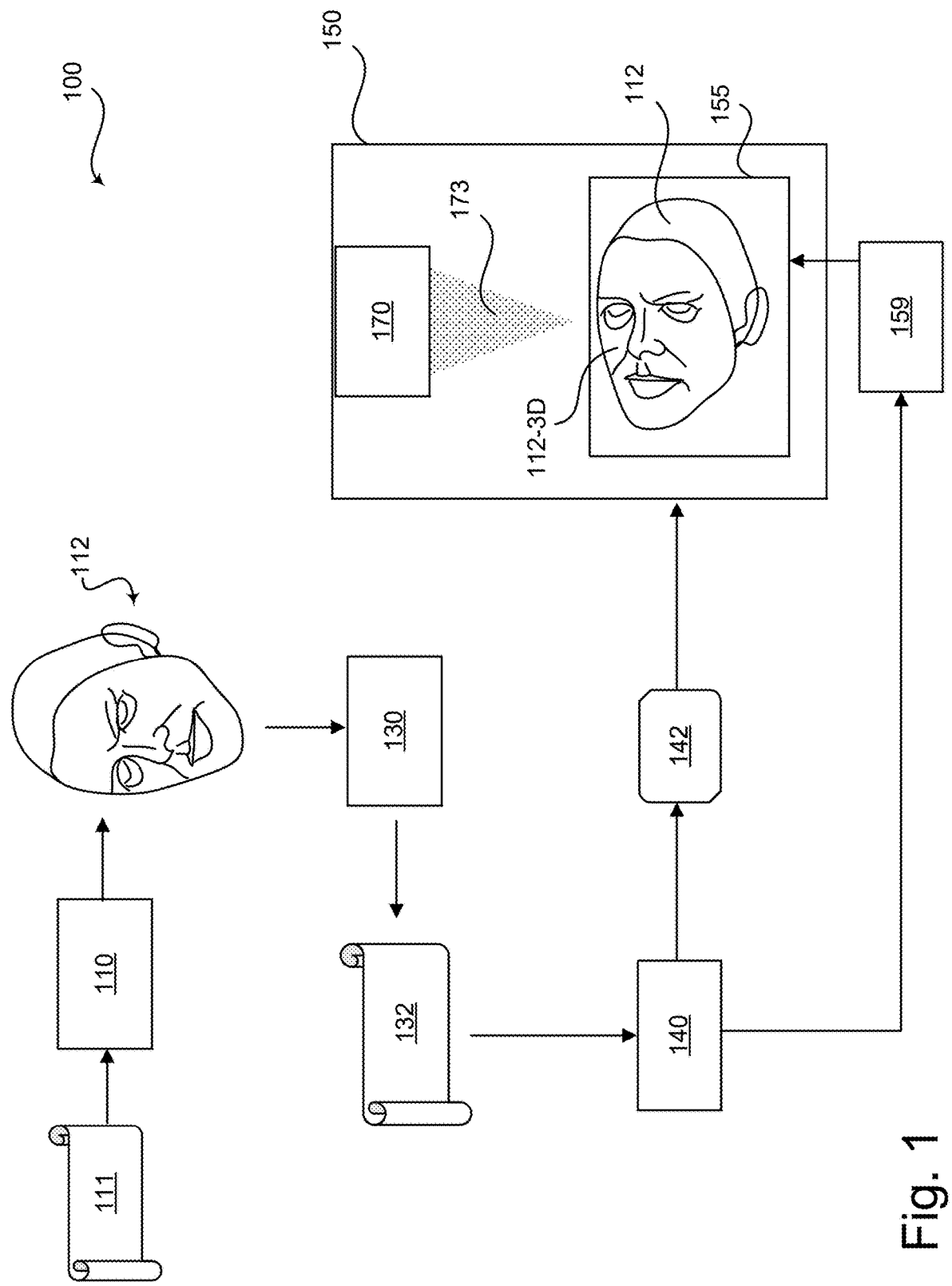
FIG. 1 is a block diagram of an inkjet printing system including a production apparatus configured to produce a three-dimensional body, a metrology apparatus configured to produce a topographical printing design from the three-dimensional body, a control apparatus, and an inkjet printing apparatus configured to apply the topographical printing design to the three-dimensional body.

Referring to FIG. 1, an inkjet printing system 100 is shown. The inkjet printing system 100 includes a production apparatus 110, a metrology apparatus 130, a control apparatus 140, and an inkjet printing apparatus 150. The control apparatus 140 is in communication with the metrology apparatus 130 and the inkjet printing apparatus 150.

The production apparatus 110 is configured to receive an original body template 111 and to produce a three-dimensional body 112 based on the original body template 111. The metrology apparatus 130 is configured to receive the produced three-dimensional body 112 from the production apparatus 110. The metrology apparatus 130 topographically scans the received three-dimensional body 112 to thereby produce an updated body template 132 of the three-dimensional body 112. The differences between the updated body template 132 and the original body template 111 reveal information about how the production of the three-dimensional body 112 impacts or modifies the shape of the three-dimensional body 112 beyond the original body template 111. The control apparatus 140 is configured to receive the updated body template 132 and to create a topographical printing design 142 based on the updated body template 132.

The inkjet printing apparatus 150 is configured to receive the three-dimensional body 112 and to apply the created topographical printing design 142 to the three-dimensional region 112-3D of the three-dimensional body 112. For example, as discussed later, the inkjet printing apparatus 150 includes a fixture apparatus 155 and an ink supply apparatus 170 that are in a controllable and adjustable position relative to each other. The fixture apparatus 155 is configured to receive and fix the three-dimensional body 112. The ink supply apparatus 170 is configured to apply ink or paint 173 to the three-dimensional body 112 in accordance with the created topographical printing design 142.

Once the three-dimensional body 112 is formed by the production apparatus 110, the design elements of the three-dimensional region 112-3D need to be printed by way of inkjet printing using the inject printing apparatus 150. However, before the inkjet printing even begins, it is possible that the three-dimensional body 112 and the region 112-3D have been deformed by the very process of the production apparatus 110 so that the three-dimensional body 112 does not match up as well with the original body template 111. These deformations to the body 112 are unforeseen and unpredictable. For example, if the production apparatus 110 is an injection molding apparatus, then it is possible for the three-dimensional body 112 to shrink after removal from the production apparatus 110 and after the body 112 has fully cooled. Because of this, the body 112 may not match the original body template 111.

Thus, the inkjet printing apparatus 150 does not use the original body template 111; rather, the inkjet printing apparatus 150 uses the updated body template 132. In particular, the inkjet printing apparatus 150 can be updated in one or more aspects based on the updated body template 132. In this way, the three-dimensional region 112-3D of the body 112 and the ink or design that is applied to the three-dimensional region 112-3D of the body 112 are more consistently aligned, and the ink or design that is applied to the three-dimensional region 112-3D of the body 112 is adjusted to accommodate for the unforeseen changes to the body 112 that occur during production in the production apparatus 110.

For example, the fixture apparatus 155 can be manufactured based on the updated body template 132. In particular, the fixture apparatus 155 is manufactured with a fixture manufacturing device 159. The fixture manufacturing device 159 receives the updated body template 132 and adjusts how the fixture apparatus 155 is designed based on the updated body template 132. For example, an interface between the three-dimensional region 112-3D of the body 112 and a surface of the fixture apparatus 155 can be designed to provide a tighter and more secure fit, as discussed in greater detail with reference to FIG. 3 and also shown in FIGS. 4A and 4B.

As another example, the ink supply apparatus 170 can adjust how the ink 173 is applied to the three-dimensional region 112-3D of the body 112 based on the topographical printing design 142, which the control apparatus 140 produces from the updated body template 132. That is, the artwork applied to the region 112-3D can be adjusted to accommodate the changes that occurred during the production of the body 112, such changes being captured in the topographical printing design 142.

In some implementations, the three-dimensional body 112 is a head of a toy, doll, or action figure, such as shown in FIG. 1. In this case, the region 112-3D is a face of the head. In other implementations, the three-dimensional body 112 is another part of a humanoid form of a toy, doll, or action figure. For example, the three-dimensional body 112 can be a torso of a toy, doll, or action figure, and the region 112-3D can be a chest surface of the torso. As another example, the three-dimensional body 112 can be an appendage such as an arm or leg of a toy, doll, or action figure, and the region 112-3D can be a surface of that appendage. In other implementations, the three-dimensional body 112 is a shape of a toy such as a toy gun or a toy electronic.

Referring again to FIG. 1, the metrology apparatus 130 can use three-dimensional scanning to analyze the three-dimensional region 112-3D of the body 112. In particular, the scanning can collect data on the shape of the region 112-3D. The metrology apparatus 130 uses this collected data to construct the updated body template 132, which is a digital three-dimensional model that represents the shape of the body 112. The updated body template 132 can therefore include a point cloud of geometric samples on the region 112-3D of the body 112. These points can be used to extrapolate the shape of the region 112-3D.

The metrology apparatus 130 includes a scan fixture that fixes the body 112 relative to the three-dimensional scanner and the three-dimensional scanner collects information about the region 112-3D or the body 112 at surfaces that are in its field of view.

In some implementations, the entire surface of the body 112, including the region 112-3D, is scanned. A more precise registration between the region 112-3D and the ink supply apparatus 170 can be obtained by scanning the entire surface of the body 112 (and not only the region 112-3D). For example, and with additional reference to FIGS. 4A and 4B, a rear region 112-R of the body 112 and the region 112-3D (which can be considered at a front region of the body 112) are both scanned. The information obtained from scanning the region 112-3D (which is incorporated into the updated body template 132) can be used by the fixture manufacturing device 159 to thereby adjust how the fixture apparatus 155 is designed. Specifically, this is useful because the fixture apparatus 155 comes in contact with the region 112-3D or the surface surrounding the region 112-3D.

The information obtained from scanning the rear region 112-R (which is incorporated into the updated body template 132) can be used to shape a base plate portion of the fixture apparatus 155, such base plate portion being in physical contact with the region 112-R during inkjet printing. For example, with reference to FIG. 3, and also to FIGS. 4A and 4B, which are discussed in greater detail below, a fixture apparatus 355 includes a base plate portion 356p, the base plate portion 356p receiving the rear region 112-R of the body 112 when the body 112 is placed in a body volume 374 of the fixture apparatus 355. The body volume 374 is an open volume of a sub-fixture 358 of the fixture apparatus 355, the open volume being defined between the base plate portion 356p and a guide plate portion 357p, and the body volume 374 being configured to receive the body 112, as discussed in more detail below. The base plate portion 356p can include a soft pad 456p (see FIGS. 4A and 4B), and the soft pad 456p can be created based on the information in the updated body template 132 relating to the rear region 112-R. After the soft pad 456p is formed, it can be fixed (for example, by adhesive) to an inner side of the base plate portion 356p. The soft pad 456p is able to absorb some of the force applied to the body 112 when it is inserted into the body volume 374 of the fixture apparatus 355 (or 455). The soft pad 456p also enables the fixture apparatus 355 to tolerate variance in the deformation or shrinkage of the body 112 that occurs when the body 112 is formed by the production apparatus 110. The soft pad 456p can be made of a resilient and stable material such as rubber, silicon, or other thermal setting soft plastic. The soft pad 456p should be able to withstand aging without permanent deformation with each use so as to maintain consistent holding force to the body 112. The shape of the soft pad 456p can be a plain surface or it can have a shape that conforms to the shape of the rear region 112-R of the body 112. For example, the shape of the soft pad 456p can depend on the accuracy requirements for inkjet printing and the size of the body 112.

The updated body template 132 can be considered a picture that is produced by the three-dimensional scanner and such picture describes the distance to region 112-3D at each point in that picture. This allows the three-dimensional position of each point in that picture to be identified.

The metrology apparatus 130 can capture a complete model of the body 112 after one or more scans. Moreover, the metrology apparatus 130 can capture various scans from different directions to obtain information about all sides of the body 112 or different curves/contours of the region 112-3D. These scans are combined into a common reference system (using an alignment or registration), and then merged to create the complete three-dimensional model (which is the updated body template 132).

In some implementations, the metrology apparatus 130 uses a non-contact (that is, contactless) technology that can be active or passive. For example, the metrology apparatus 130 can include a radiation source that emits some kind of radiation or light and a detector that detects a reflection or transmission of the radiation relative to the body 112 in order to probe the body 112. Possible types of emissions used include light (such as laser), ultrasound, or x-ray. As another example, the metrology apparatus 130 lacks a radiation source and the detector detects reflected ambient radiation (such as visible light or infrared light). The metrology apparatus 130 can be a stereoscopic system, a photometric system usually use a single camera, or a silhouette technique. In other implementations, the metrology apparatus 130 uses a contact technology.

As an example, the metrology apparatus 130 includes a three-dimensional (3D) scanning technology that uses laser triangulation or structured light technology.

As another example, the metrology apparatus 130 includes a laser-based 3D scanner that uses a process called trigonometric triangulation that can accurately capture a 3D shape as millions of points. Such a laser-based 3D scanner works by projecting a laser line or multiple lines onto an object and then capturing its reflection with a single sensor or multiple sensors.

Such sensors are located at known distances from the laser's source. Accurate point measurements can be made by calculating the reflection angle of the laser light.

As a further example, the metrology apparatus 130 includes a projected or structured light 3D scanner that uses a blue or white light emitting diode (LED) projected light. A light pattern consisting of bars, blocks, or other shapes is projected onto the body 112. One or more sensors look at the edge of those patterns or structured shapes to determine the 3D shape of the body 112. Trigonometric triangulation methods can be used because the distance from the sensors to the light source (LED) is known.

Referring again to FIG. 1, the control apparatus 140 is configured to receive the updated body template 132 and to create the topographical printing design 142 based on the updated body template 132. The control apparatus 140 includes an electronic processor, an electronic storage, and an input/output (I/O) interface. The electronic processor is one or more processors suitable for the execution of a computer program such as a general or special purpose microprocessor, and any one or more processors of any kind of digital computer. Generally, a processor receives instructions and data from a read-only memory or a random access memory or both. The electronic processor can be any type of electronic processor. The electronic storage can be volatile memory, such as RAM, or non-volatile memory. In some implementations, the electronic storage can include both non-volatile and volatile portions or components. The electronic storage stores instructions, perhaps as a computer program, that, when executed, cause the processor to communicate with other components in the control apparatus 140 or other components of the inkjet printing system 100. The I/O interface is any kind of electronic interface that allows the control apparatus 140 to receive and/or provide data and signals to other components of the inkjet printing system 100, an operator, and/or an automated process running on another electronic device. For example, the I/O interface can include one or more of a touch screen or a communications interface.

Figure 2:
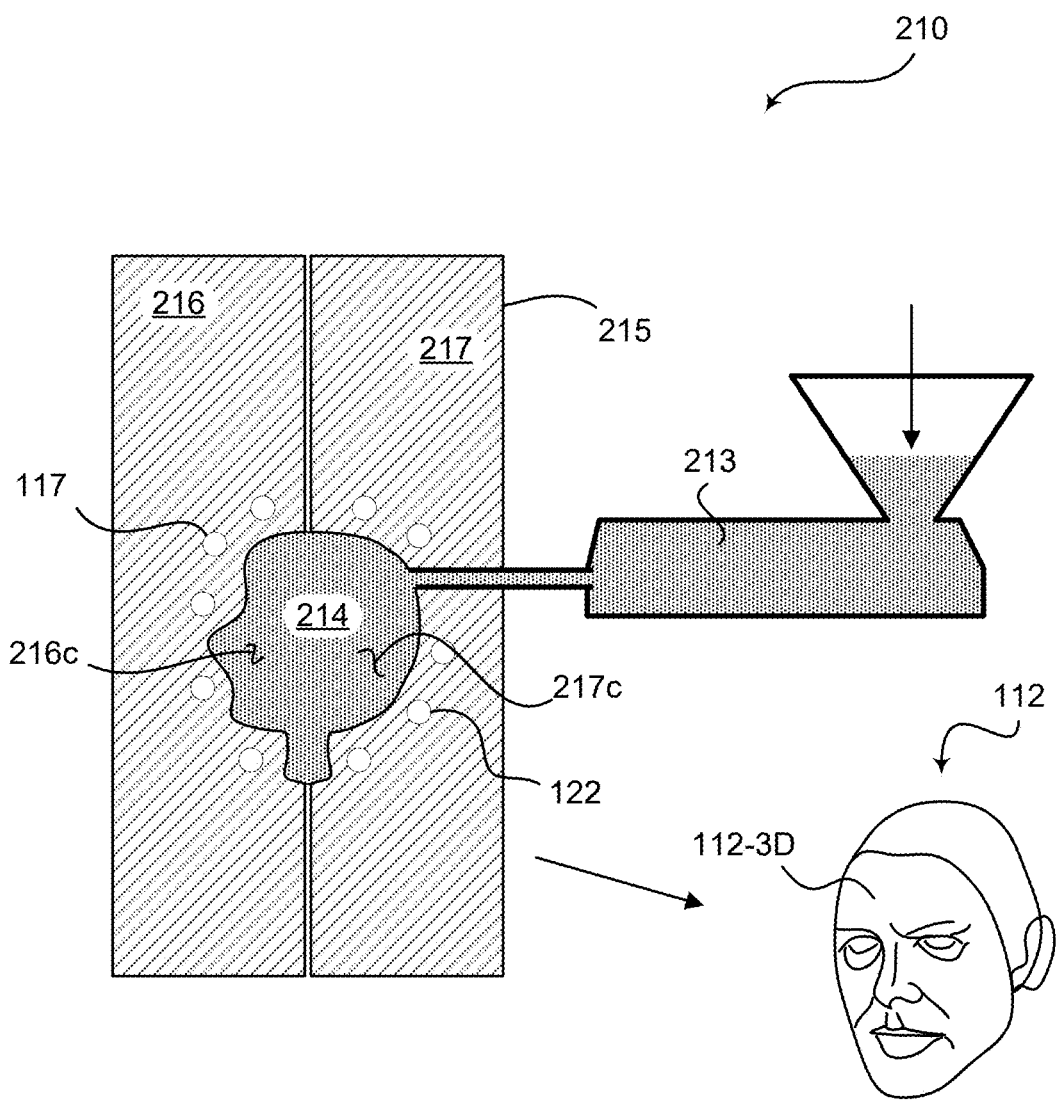
FIG. 2 is a block diagram of an implementation of the production apparatus of FIG. 1.

Referring to FIG. 2, an implementation 210 of the production apparatus 110 is shown. In this implementation, the production apparatus 210 is an injection molding apparatus in which material 213 is injected into a cavity 214 of an injection mold 215. The injection mold 215 is made up of a pair of mold components 216, 217 that define respective cavities 216c, 217c; when the mold components 216, 217 are attached to each other (as shown in FIG. 2), the cavity 214 is formed. The shape of the cavities 216c, 217c and therefore the shape of the cavity 214 determine the shape of the three-dimensional body 112, including any three-dimensional aspects or contours that form a three-dimensional region 112-3D (such as a face) to be printed with a design.

Although not required, the mold components 216, 217 of the injection mold 215 can be fabricated using a computer-aided manufacturing such as a computer-guided tooling machine.

Figure 3:
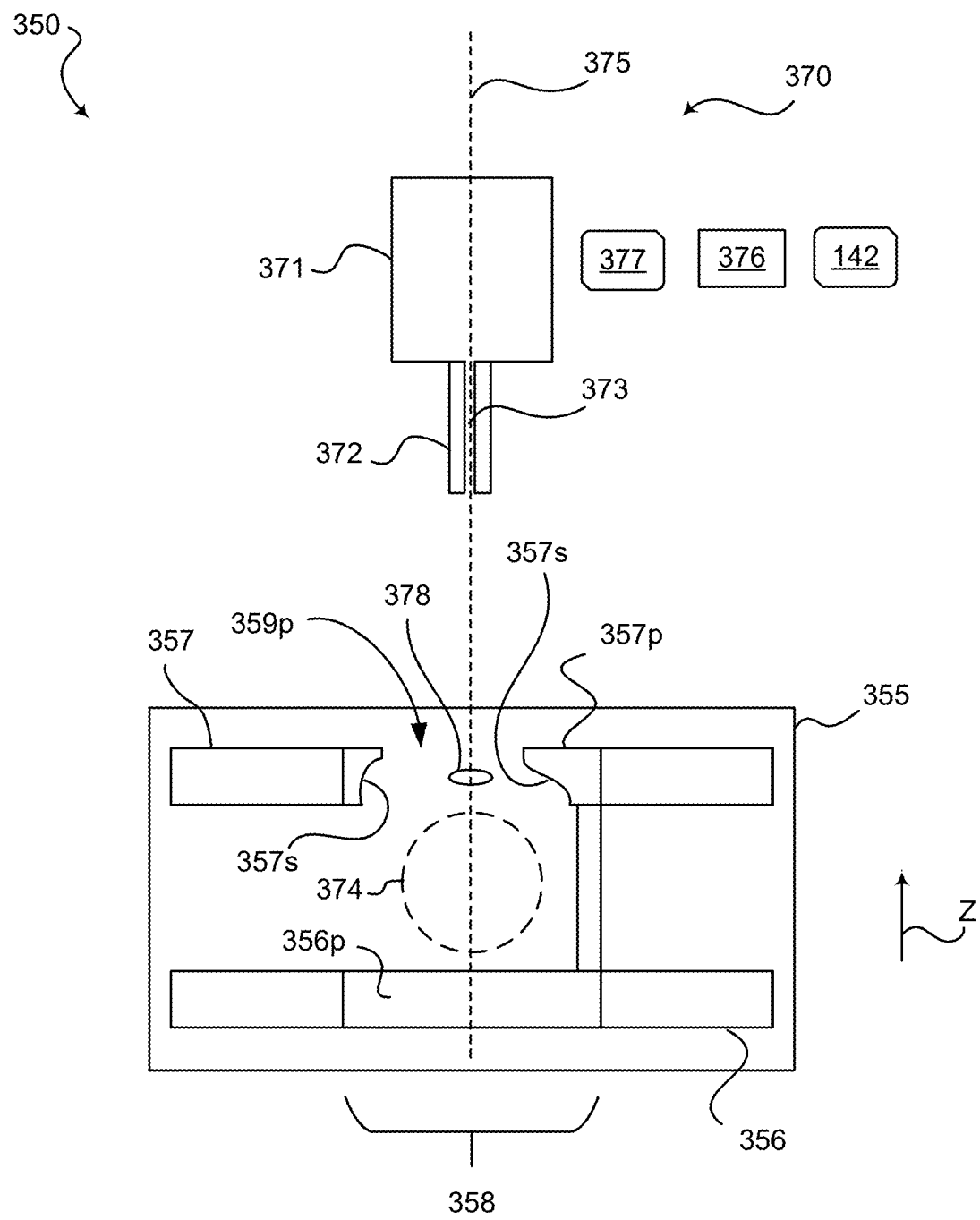
FIG. 3 is a block diagram of an implementation of the inkjet printing apparatus of FIG. 1.

Referring to FIG. 3, an implementation 350 of the inkjet printing apparatus 150 is shown. The inkjet printing apparatus 350 includes an ink supply apparatus 370 and a fixture apparatus 355 that are arranged in a known and adjustable manner relative to each other. The ink supply apparatus 370 includes one or more reservoirs 371, each for storing ink, and one or more nozzles 372. Each nozzle 372 defines an opening 373 at a first end in fluid communication with at least one of the reservoirs 371 and at a second end aligned with a target region 378. The opening 373 extends along an axial direction 375.

The fixture apparatus 355 is configured to interact with the target region 378 and when the target region 378 is properly encompassed by the fixture apparatus 355, a Z direction defined by the fixture apparatus 355 is parallel with and overlapping the axial direction 375. By convention, the Z direction extends from a back side of the body 112 toward the region 112-3D of the body 112. The fixture apparatus 355 includes: a base plate 356 and a guide plate 357 configured to be connected to the base plate 356. The fixture apparatus 355 includes one or more sub-fixtures 358, with each sub-fixture 358 being defined by a portion 357p of the guide plate 357 and a portion 356p of the base plate 356. The portions 356p, 357p are aligned along the Z direction.

Each guide plate portion 357p includes a surface 357s facing the body volume 374, the surface 357s having a topographical shape that is complementary with the region 112-3D of the three-dimensional body 112, as discussed below. Each guide plate portion 357p defines a printing opening 359p that is larger than a printing region defined within the region 112-3D of the three-dimensional body 112. The guide plate portion 357 receives the region 112-3D and the base plate portion 356p receives a rear region 112-R of the body 112 when the body is placed in the body volume 374.

The guide plate 357 faces one or more nozzles 372 when the target region 378 is encompassed by the fixture apparatus 355. The printing opening 359p is exposed to the opening 373 of the nozzle 372 when the body volume 374 and the Z direction is aligned with the axial direction 375.

In operation of the inkjet printing apparatus 350, the three-dimensional body 112 is received in the body volume 374 and is fixed between the base plate portion 356p and the guide plate portion 357p when the guide plate 357 and the base plate 356 are attached to each other. Each guide plate portion 357p is in contact with the front region of the three-dimensional body 112 (around a perimeter of the region 112-3D) and a distance between the guide plate portion 357p and one or more nozzles 372 is controlled. The region 112-3D of the three-dimensional body 112 is exposed by way of the printing opening 359p of the guide plate portion 357p. This means that the region 112-3D is also exposed to the opening 373 of the nozzle 372.

The nozzle 372 is configured to project ink from the one or more reservoirs 371 toward the target region 378 and along a −Z direction in accordance with the topographical printing design 142, which is based on the topographical shape of the three-dimensional body 112 determined by the metrology apparatus 130, as discussed above.

The inkjet printing apparatus 350 can also include a dedicated control system 376 in communication with the ink supply apparatus 370 (and the reservoirs 371) as well as the control apparatus 140. The control system 376 is configured to control one or more properties of the ink 173 emitted from the one or more nozzles 372 based on the topographical printing design 142.

As discussed above with reference to FIG. 1, the inkjet printing apparatus 150 is updated in one or more aspects based on the updated body template 132. Thus, with reference to FIGS. 3 and 4, the three-dimensional region 112-3D of the body 112 and the ink or design that is applied to the three-dimensional region 112-3D of the body 112 are more consistently aligned because the interface between the fixture apparatus 155 and the three-dimensional region 112-3D is adjusted based on the updated body template 132. And, the ink or design that is applied to the three-dimensional region 112-3D of the body 112 is adjusted based on the topographical printing design 142 (which is produced from the updated body template 132) to accommodate for the unforeseen changes to the body 112 that occur during production in the production apparatus 110.

For example, the ink supply apparatus 370 can adjust how the ink 373 is applied to the three-dimensional region of the body 112 based on the topographical printing design 142. In particular, the control system 376 can design or produce artwork 377 for inkjet printing based on the topographical printing design 142. The nozzle 372 projects the ink 173 along the −Z direction toward the region 112-3D (which can be the face of the head) during printing in accordance with the artwork 377.

As another example, with reference to FIG. 1, the fixture manufacturing device 159 receives the updated body template 132 from the control apparatus 140, and adjusts how the surface 357s is designed based on the updated body template 132 to thereby provide a tighter and more secure fit at the interface between the region 112-3D and the surface 357s. Specifically, the topographical shape of the surface 357s is formed based on the updated body template 132. The fixture manufacturing device 159 uses the updated body template 132 to build the guide plate portion 357p of the fixture apparatus 355, which holds the body 112 during inkjet printing. The fixture manufacturing device 159 can use computer numeric control (CNC) to cut or shape the form of the guide plate portion 357p to thereby adjust the geometric shape of the surface 357s, and this is done based on the updated body template 132. In this way, the surface 357s is more accurately shaped like the body 112 that is output from the production apparatus 110. The surface 357s has a geometric shape that is complementary to a perimeter of the region 112-3D of the three-dimensional body 112.

As shown in FIG. 4A, the fixture apparatus 355, and specifically, each sub-fixture 358 is designed so that it registers with the region 112-3D of the body 112 instead of a rear region 112-R of the body 112 when the body 112 is placed within the body volume 374. This means that it is the region 112-3D of the body 112 that is placed in a known position relative to the nozzle 372. By using the region 112-3D (that faces the nozzle 372) instead of the rear region 112-R of the body 112 for registration with the nozzle 372 (and therefore the ink supply apparatus 170), the accumulated deformation that extends from the region 112-3D to the rear region 112-R of the body 112 due to the injection molding process (performed by the production apparatus 110 as shown in FIG. 1) that forms the body 112 is removed as a factor in inkjet printing (performed by the inkjet printing apparatus 150 as shown in FIG. 1). In particular, each guide plate portion 357p is in registration with the region 112-3D of the body 112. And, because each guide plate portion 357p is also in registration with the nozzle 372, the entire inkjet printing apparatus 150 has a more accurate placement of the region 112-3D relative to the ink 173 projected to the region 112-3D.

The rear region 112-R of the body 112 is in registration with the base plate portion 356p but the base plate portion 356p is not placed in a known position relative to the nozzle 372. Thus, the rear region 112-R of the body 112 is not in registration with the guide plate portion 357p or the nozzle 372 or the ink supply apparatus 170. This is important because, as discussed above, there could be unpredictable deformities that arise during the production of the body 112 (by the production apparatus 110) and any registration that relies on the rear region 112-R of the body 112 would fail to capture these unpredictable deformities in the body 112 that are between the rear region 1112-R and the region 112-3D to be printed. Additionally, the base plate portion 356p can include a deformable surface that conforms to the shape of the rear region 112-R, as shown in FIG. 4A, to further improve the fixing and mating between the body 112 and the sub-fixture 358.

In this way, if the body 112 is a head and the region 112-3D is a face of the head, then the sub-fixture 358 relies only on the effective mating sculpting such as the forehead, the cheeks, and the chin on the face. Even if the overall face depresses slightly due to shrinkage during injection molding (performed by the production apparatus 110), the positions of the three-dimensional features on the face such as the eyeballs and the lips remain unchanged and have a negligible impact on the precision of the inkjet decorations applied by the inkjet printing apparatus 150.

FIG. 4B shows a plan view of the sub-fixture 358 showing another view when the body 112 is placed in the body volume 374.

As shown in FIG. 4C, the orientation and plane angle of the region 112-3D registered in the guide plate portion 357p of the fixture apparatus 355 matches the inkjet printing position and angle (defined by the axial direction 375) because both the inkjet artwork 377 and the guide plate portion 357p of the fixture apparatus 355 are built from the same updated body template 132. The use of the updated body template 132 for making the inkjet artwork 377 (using the topographical printing design 142) and the face guide plate portion 357p of the fixture apparatus 355 (using the fixture manufacturing device 159) attains consistent alignment for a plurality of printings in one process or operation.

Figure 5B:
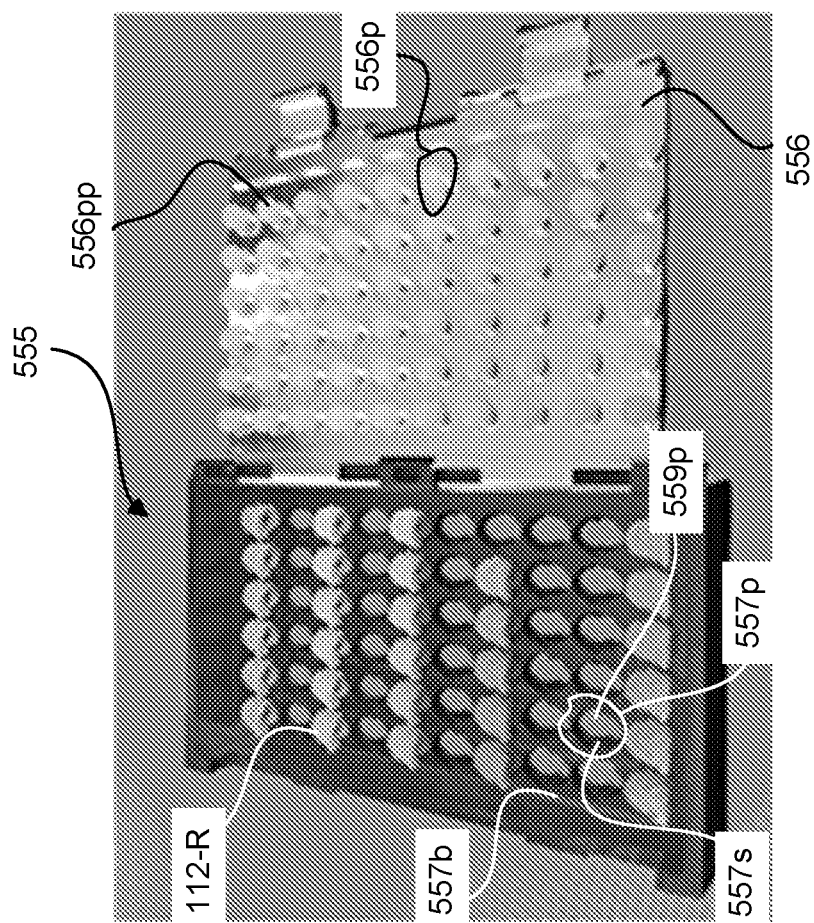
FIG. 5B is a top perspective and open view of the fixture apparatus of FIG. 5A.
Figure 5A:
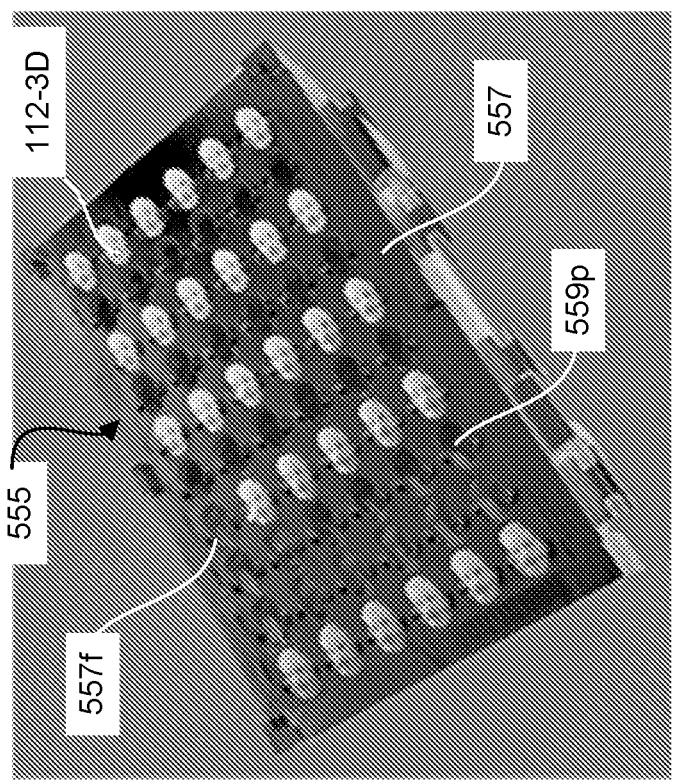
FIG. 5A is a top perspective and closed view of an implementation of a fixture apparatus for use in the inkjet printing apparatus of FIG. 1 and configured to receive a plurality of three-dimensional bodies.

Next, with reference to FIGS. 5A and 5B, another implementation of a fixture apparatus 555 that can be used in the inkjet printing apparatus 350 is discussed. The fixture apparatus 555 is able to receive sixty bodies 112 (which in this example, are shaped as heads H). Sixty sub-fixtures are therefore formed, with each sub-fixture including a guide plate portion 557p and a base plate portion 556p and each sub-fixture defining an opening 559p. The fixture apparatus 555 includes a guide plate 557 that receives the heads H in the respective openings 559p and a base plate 556 that is hinged relative to the guide plate 557. The guide plate portions 557p are arranged as a two-dimensional array in the guide plate 557 and the base plate portions 556p are arranged as a two-dimensional array in the base plate 556 so that each sub-fixture includes a base plate portion aligned with a respective guide plate portion.

FIG. 5A shows a top perspective view of a closed fixture apparatus 555 in which some of the heads H have been placed. When closed, the base plate 556 and the guide plate 557 are latched together so that the heads H are secured between the base plate 556 and the guide plate 557 in their respective body volume 374. A front side 557f of the guide plate 557 is exposed and the printing area (region 112-3D) of each face F is exposed. FIG. 5B shows a perspective view of the fixture apparatus 555 in an open state in which some of the heads H have been placed. In the open state, the base plate 556 is detached from the guide plate 557 and a back side 557b of the guide plate 557 as well as the rear region 112-R of each head H is exposed. Each base plate portion 556p includes a soft pad 556pp (visible in open state) in registration with each printing opening 559p so that when the head H is placed in the body volume 374 and the base plate 556 and the guide plate 557 are latched together, the rear region 112-R of the head H is in contact with the soft pad 556pp aligned with the respective body volume 374 and the respective printing opening 559p.

After the updated body template 132 of each of the faces F of the heads H is produced (FIG. 1), then the surface 557s of each guide plate portion 557p that receives the face F is machined (via the fixture manufacturing device 159) to precisely match the respective face F that will be received in that body volume 374. The machining of each surface 557s is based on the updated body template 132. Once all of the faces F are inserted into their respective body volumes 374, the fixture apparatus 555 is closed by attaching (such as by latching) the base plate 556 and the guide plate 557 and then the closed fixture apparatus 555 is placed on a workbench.

The inkjet artwork 377 has been adjusted to accommodate the topographical printing design 142 of each of the faces F that are in the fixture apparatus 555 and then the inkjet printing apparats 150 operates on the faces F while the fixture apparatus 555 is on the workbench.

In some implementations, in order to improve efficiency in manufacturing, the fixture apparatus 555 is configured to receive sixty bodies 112 that are formed based on the same original body template 111. In some implementations, each body 112 that is placed into the fixture 555 can be separately scanned by the metrology apparatus 130. In these implementations, then, each of the guide plate portions 557p and base plate portions 556p and each sub-fixture defining the printing opening 559p is built to match the respective body 112 received in that printing opening 559p. In other implementations, only a single body 112 that is placed into the fixture 555 is separately scanned by the metrology apparatus 130. In these implementations, then, each of the guide plate portions 557p and base plate portions 556p and each sub-fixture defining the printing opening 559p is built to match the singly-scanned body 112 so each sub-fixture is identical to each other.

Figure 6:
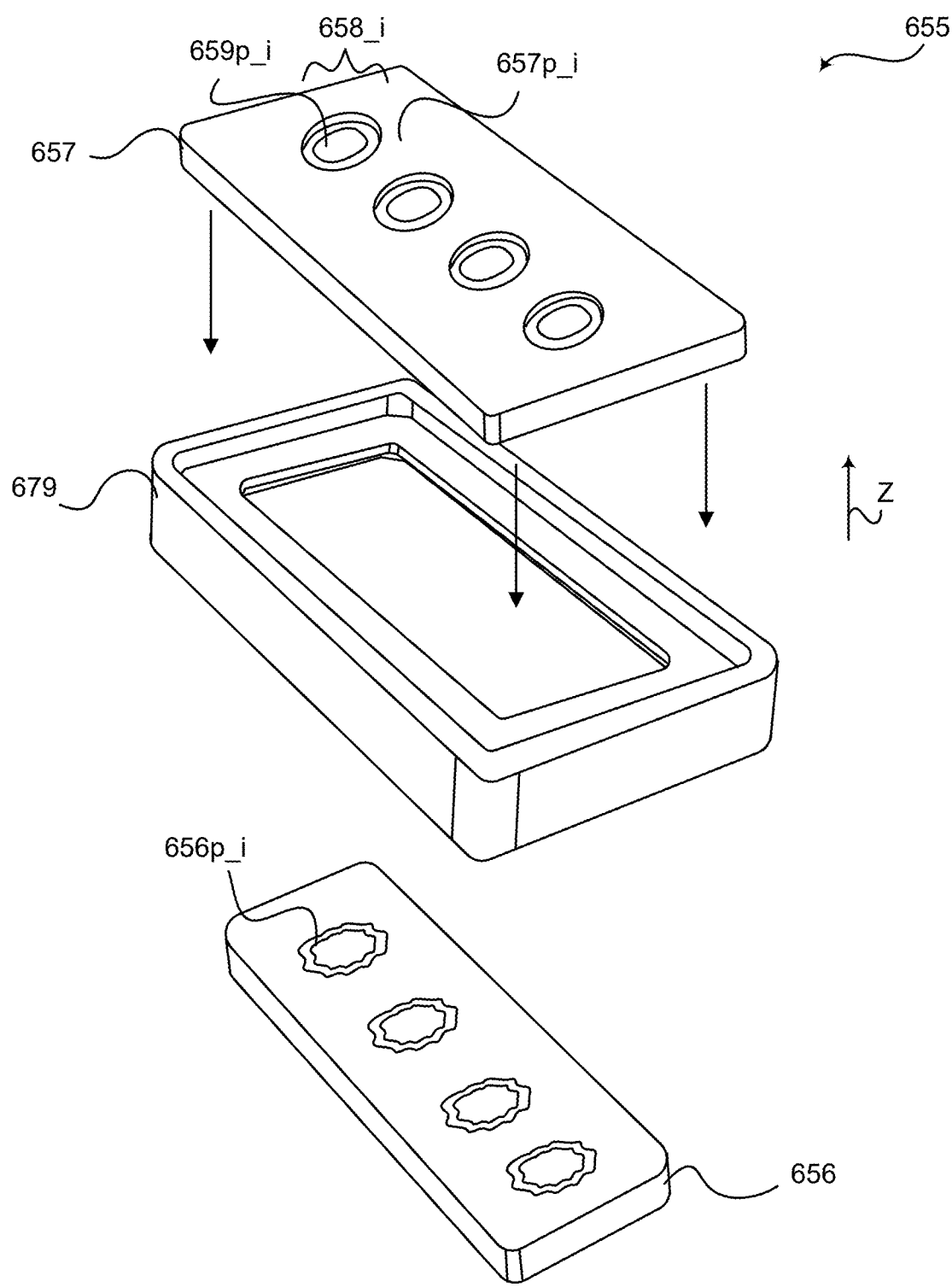
FIG. 6 is an exploded perspective top view of an implementation of a fixture apparatus for use in the inkjet printing apparatus of FIG. 1 and configured to receive four three-dimensional bodies.
Figure 7:
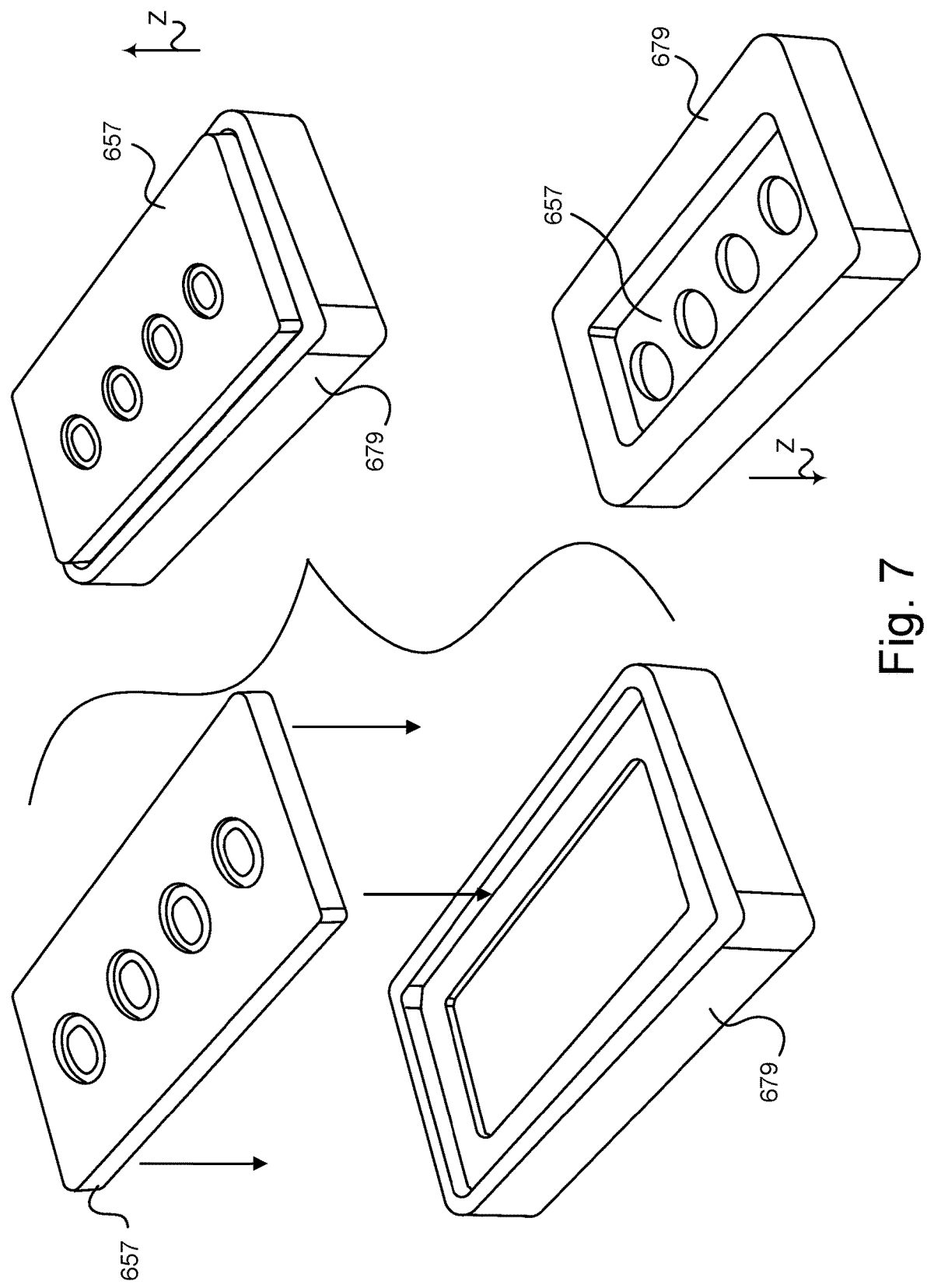
FIG. 7 is a perspective top view of a frame and a guide plate of the fixture apparatus of FIG. 6 including the assembly of the frame and the guide plate.

Referring to FIGS. 6 and 7, another implementation of a fixture apparatus 655 that can be used in the inkjet printing apparatus 350 is shown. In this implementation, the fixture apparatus 655 is able to receive a row of bodies 112 (which in this example, are shaped as heads H). In this example, the row can accommodate four bodies 112. The fixture apparatus 655 includes a guide plate 657 and a base plate 656. Four sub-fixtures are formed, with each sub-fixture including a portion 657p_i of the guide plate 657 and a respective and aligned portion 656p_i of the base plate 656. Each sub-fixture defines an opening 659p_i. In this implementation, the fixture apparatus 655 also includes a rigid frame 679 into which the removable guide plate 657 and the removable base plate 656 are fixed. In this way, the guide plate 657 and/or the base plate 656 can be removed and replaced with a new guide plate 657 and a new base plate 656. For example, the guide plate 657 can be replaced with a new guide plate 657 if an updated body template 132 is produced from one or more new scans of bodies 112. The bodies 112 to be printed are received in the respective openings 659p_i and then the base plate 656 that is fixed to the guide plate 657.

Figure 8:
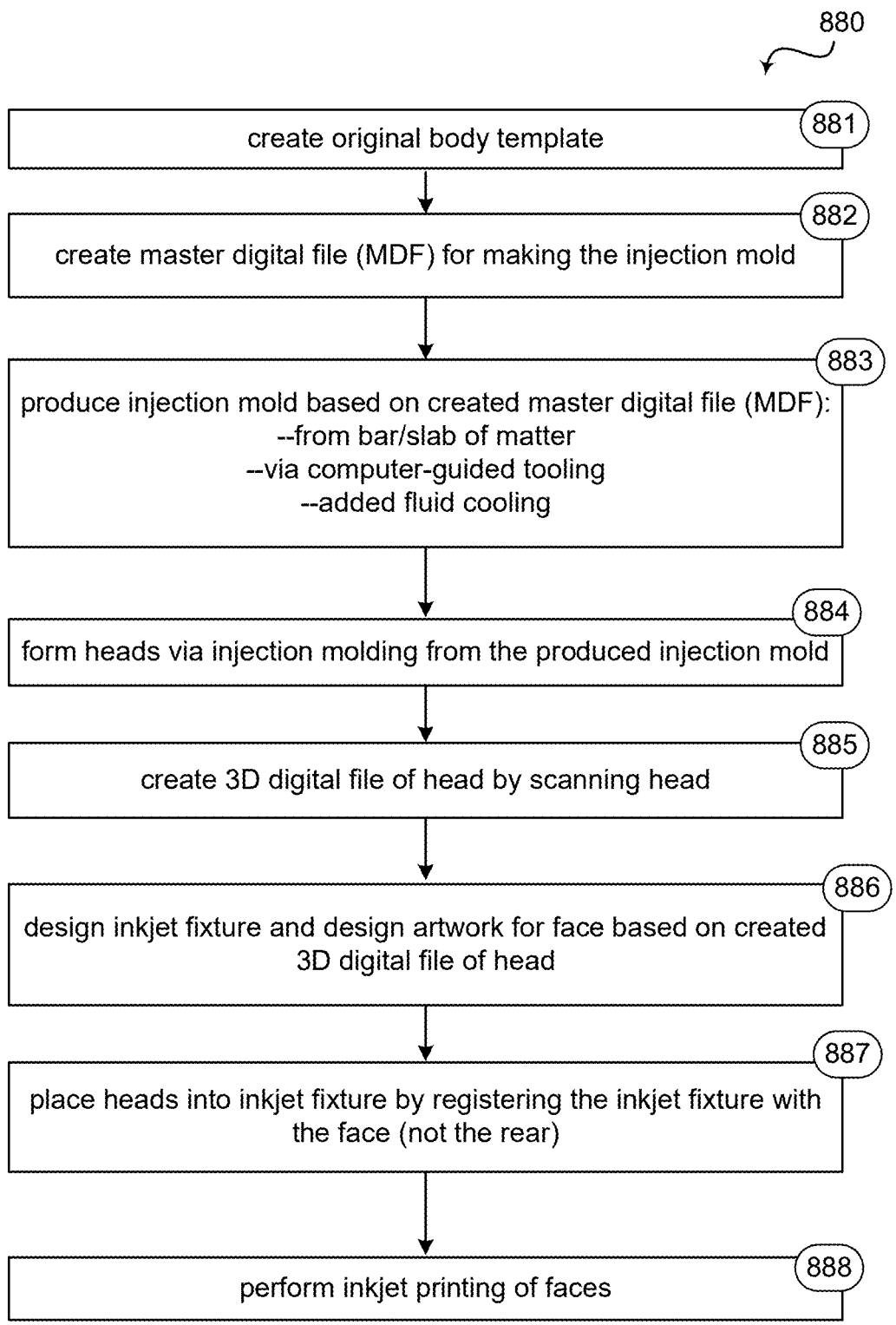
FIG. 8 is a flow chart of an exemplary procedure performed by the inkjet printing system of FIG. 1.

Referring to FIG. 8, a procedure 880 is performed. Initially, the original body template 111 is created (881). A master digital file (MDF) is created from the original head template 111 (882) and this master digital file MDF is used to make or manufacture the production apparatus 110 (883). For example, if the production apparatus 110 is an injection mold 215 shown above in FIG. 2, the cavities 216c, 217c of the respective mold components 216, 217 of the injection mold 215 can be formed by machining (direct cutting) of respective raw material using a CNC tooling machine based on the master digital file (MDF). Another method that can be used to form the cavities 216c, 217c is casting. Once the injection mold 215 is produced (883), then the production apparatus 110 forms the bodies 112, using, for example, injection molding (884).

Now that the body is formed (884), the metrology apparatus 130 creates the updated body template 132 by scanning the body 112 (885), as shown in FIG. 1. The fixture apparatus 855 and the artwork for the inkjet printing apparatus 150 are created based on this updated body template 132 (886), as shown in FIG. 1. The body 112 is placed into the fixture apparatus 355 (the body volume 374) by registering the region 112-3D (and not the rear region R of the body 112) with the ink supply apparatus 170 (887), as shown in FIGS. 4A and 4B. Once the body 112 is placed into the fixture apparatus 355, then the inkjet printing apparatus 150 applies the design to the region 112-3D through the printing opening 359p (888).

Figure 9A:
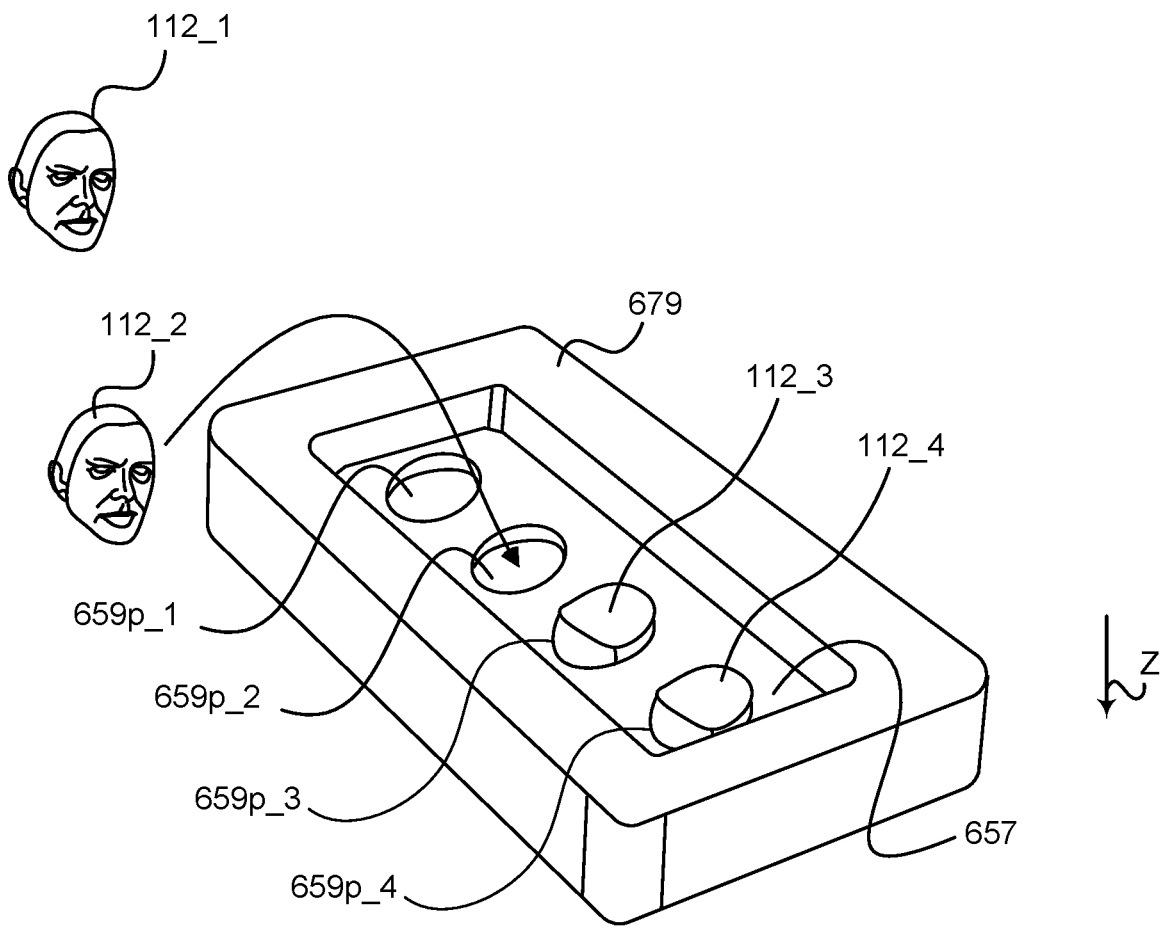
FIG. 9A is a perspective bottom view of the assembled frame and guide plate of FIG. 7 and receiving bodies in each of the plurality of openings.
Figure 9B:
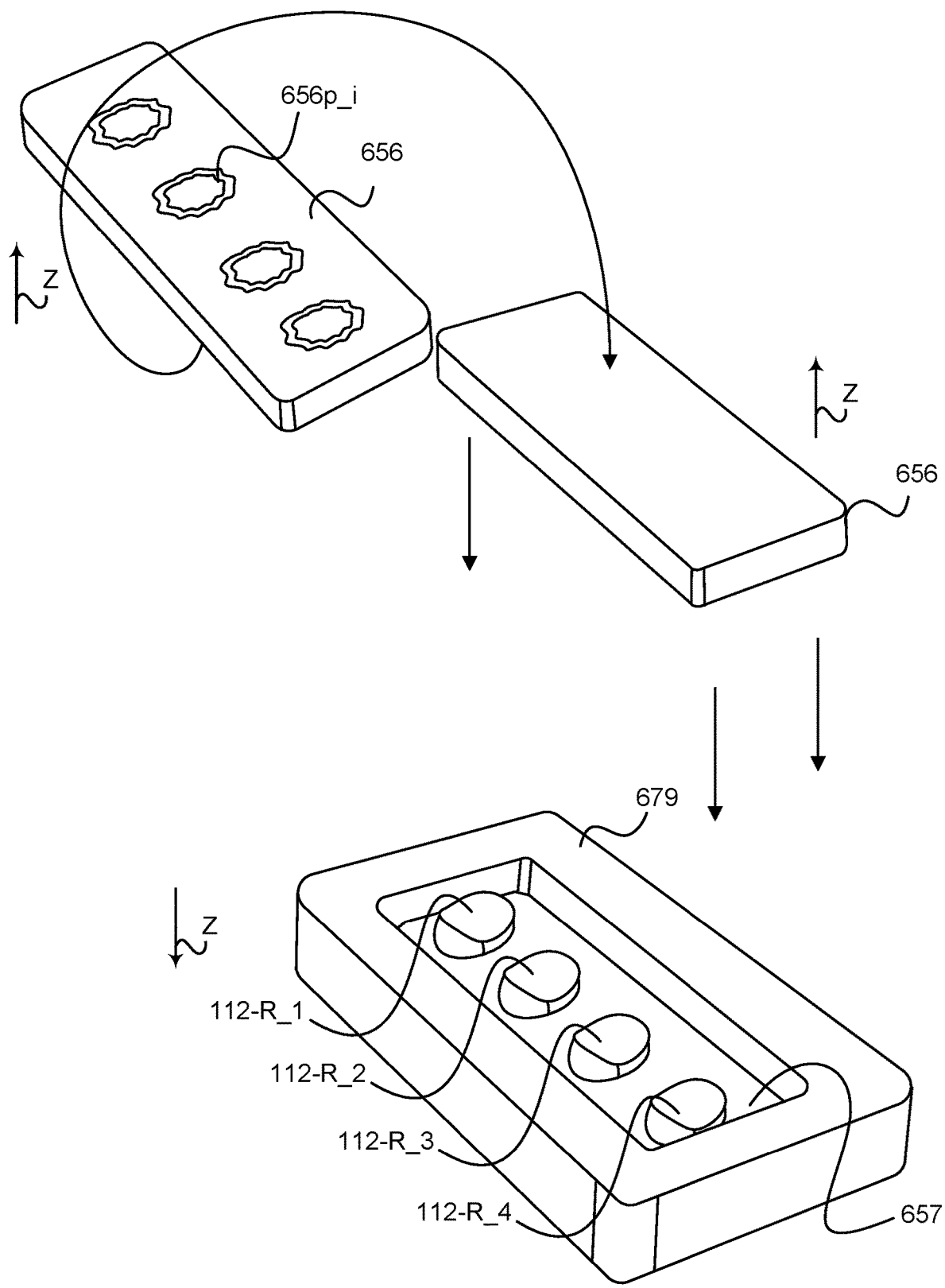
FIG. 9B is a perspective view showing a base plate being attached to the assembled frame and guide plate of FIG. 7 after the bodies are received in each of the openings as shown in FIG. 9A to form the fixture apparatus.
Figure 9C:
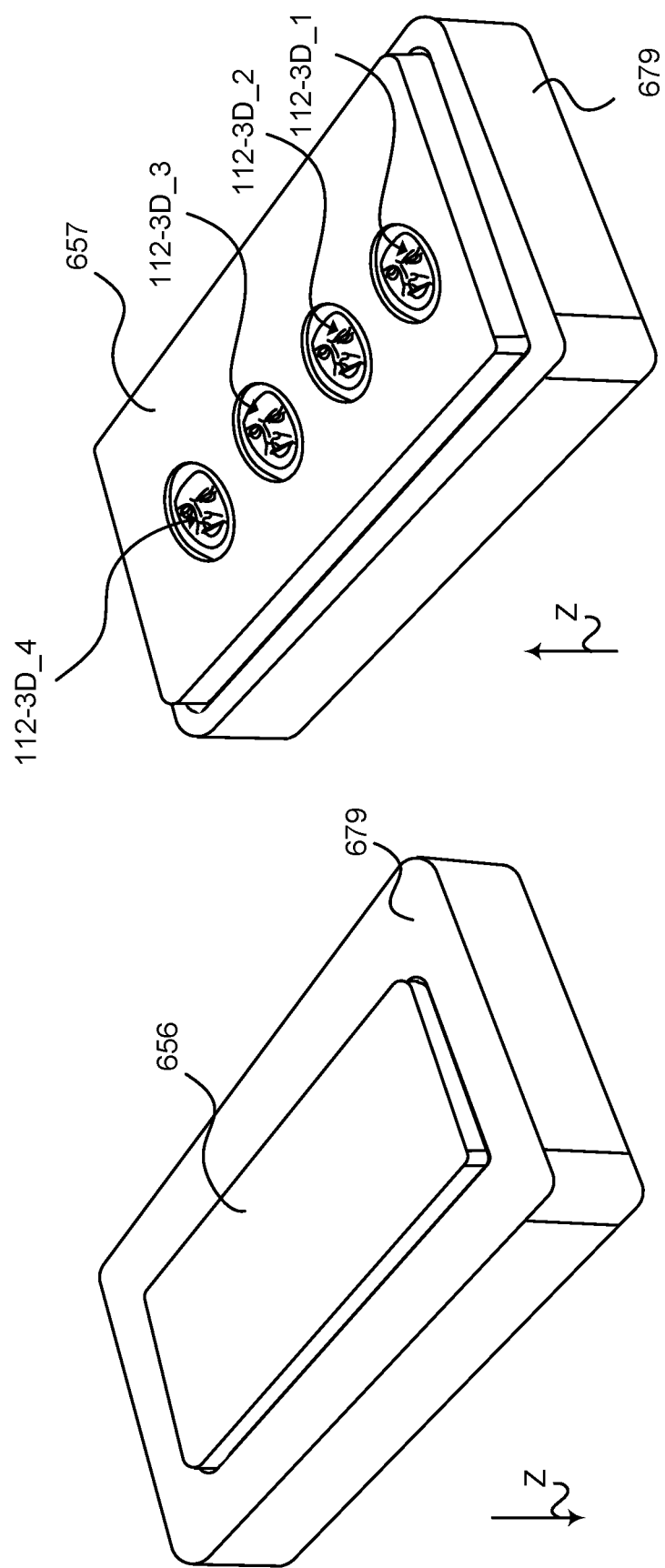
FIG. 9C are top and bottom perspective views of the assembled fixture apparatus.

For example, with reference to FIG. 9A, bodies 112_1, 112_2, 112_3, and 112_4 are pushed into respective openings 659p_1, 659p_2, 659p_3, and 659p_4 of the guide plate 657 after the guide plate 657 has been fixed within the rigid frame 679. Then, as shown in FIG. 9B, the base plate 656 is fixed to the rigid frame 679 so that the soft pads 656p_i align with the respective rear region 112-R of each body 112_i. The fully assembled fixture apparatus 655 is then ready to be incorporated into the inkjet printing apparatus 150, as shown in FIG. 9C. The region 112-3D of each body 112_i is fully exposed through the respective opening 659p_i of the guide plate 657 to enable the region 112-3D to be printed by the supply apparatus 370.

What is claimed is:

1. An inkjet printing apparatus comprising:
   an ink supply apparatus comprising one or more reservoirs for storing ink and one or more nozzles, each nozzle defining an opening at a first end in fluid communication with at least one of the reservoirs and at a second end aligned with a target region; and
   a fixture apparatus configured to interact with the target region, wherein the fixture apparatus comprises:
      a base plate;
      a guide plate configured to be connected to the base plate, wherein the guide plate faces one or more nozzles when the fixture apparatus encompasses the target region; and
      one or more sub-fixtures, each sub-fixture defined by a respective and aligned guide plate portion and base plate portion, each guide plate portion having a topographical shape that is complementary with a front region of a three-dimensional body and each guide plate portion defining a printing opening that is larger than a printing region defined within the front region of the three-dimensional body,
      wherein each three-dimensional body is fixed between the base plate portion and the guide plate portion when the guide plate and the base plate are attached to each other.

2. The inkjet printing apparatus of claim 1, wherein the printing region of each three-dimensional body is exposed by way of the printing opening of the guide plate portion.

3. The inkjet printing apparatus of claim 1, wherein the nozzle is configured to project ink from one or more reservoirs toward the target region in accordance with a topographical printing design that is based on a topographical shape of the three-dimensional body.

4. The inkjet printing apparatus of claim 1, wherein, in use, each guide plate portion is in contact with the front region of the three-dimensional body and a distance between the guide plate portion and one or more nozzles is controlled.

5. The inkjet printing apparatus of claim 1, further comprising a fixture manufacturing device configured to receive information about the topographical shape of the three-dimensional body after the three-dimensional body is produced and to adjust a geometry of the guide plate portion based on this received information.

6. The inkjet printing apparatus of claim 1, further comprising a control system in communication with the ink-supply apparatus, the control system configured to control one or more properties of the ink emitted from the one or more nozzles based on a topographical printing design.

7. The inkjet printing apparatus of claim 1, wherein the front region of the three-dimensional body encloses the printing region of the three-dimensional body that faces the ink supply apparatus.

8. The inkjet printing apparatus of claim 1, further comprising a control system in communication with the ink supply apparatus and the fixture apparatus.

9. The inkjet printing apparatus of claim 8, wherein the control system is configured to control one or more properties of the ink emitted from the one or more nozzles based on a topographical printing design.

10. The inkjet printing apparatus of claim 8, wherein the control system is configured to adjust the distance between the guide plate portion and a nozzle of the ink supply apparatus.

11. The inkjet printing apparatus of claim 8, wherein the control system is configured to register a distance between the front region of the three-dimensional body and the ink supply apparatus and adjust the distance between the guide plate portion and a nozzle of the ink supply apparatus based on the registered distance.

12. The inkjet printing apparatus of claim 8, wherein the control system is configured to adjust a distance between the front region of the three-dimensional body and the ink supply apparatus based at least on a registered distance between the front region of the three-dimensional body and the ink supply apparatus.

13. The inkjet printing apparatus of claim 12, wherein an orientation and plane angle of the front region of the three-dimensional body registered in the guide plate portion matches a position and angle of inkjet printing.

14. The inkjet printing apparatus of claim 8, wherein the control system is configured to register a distance between the front region of the three-dimensional body and the ink supply apparatus, and the control system does not rely on a registration between a rear region of the three-dimensional body and the ink supply apparatus.

15. A method of printing a three-dimensional body, the method comprising:
   creating a fixture apparatus, wherein creating the fixture apparatus comprises:
      building a guide plate that includes a plurality of guide plate portions, wherein building the guide plate comprises forming, for each guide plate portion, a topographical shape into a surface that is complementary with a front region of a three-dimensional body, and each guide plate portion defining a printing opening that is larger than a printing region defined within the front region of the three-dimensional body; and
      attaching the guide plate to a base plate such that a body volume is defined between the attached base plate and each guide plate portion;
   arranging the fixture apparatus relative to an ink supply apparatus such that each guide plate portion faces one or more nozzles of the ink supply apparatus when the fixture apparatus encompasses a target region aligned with a nozzle;
   fixing at least a three-dimensional body within the body volume of the fixture apparatus; and applying a topographical printing design to the printing region of the three-dimensional body fixed within the body volume.

16. The method of claim 15, wherein forming, for each guide plate portion, the topographical shape into the surface that is complementary with the front region of the three-dimensional body comprises adjusting the topographical shape based on an updated body template that is calculated from a topographical scan of the three-dimensional body.

17. A fixture apparatus configured to interact with a target region defined by a nozzle of an ink supply apparatus, the fixture apparatus comprising:
   a base plate;
   a guide plate configured to be connected to the base plate, wherein the guide plate faces one or more nozzles when the fixture apparatus encompasses the target region; and
   one or more sub-fixtures, each sub-fixture defined by a respective and aligned guide plate portion and base plate portion, each guide plate portion having a topographical shape that is complementary with a front region of a three-dimensional body and each guide plate portion defining a printing opening that is larger than a printing region defined within the front region of the three-dimensional body, wherein each three-dimensional body is fixed between a base plate portion and the guide plate portion when the guide plate and the base plate are attached to each other.

18. The fixture of claim 17, wherein the printing region of each three-dimensional body is exposed by way of the printing opening of the guide plate portion.

19. The fixture of claim 17, wherein, in use, each guide plate portion is in contact with the front region of the three-dimensional body and a distance between the guide plate portion and one or more nozzles is controlled.

20. The fixture of claim 17, wherein a geometry of the guide plate portion is based on a topographical scan of the three-dimensional body.

21. The fixture of claim 17, wherein the front region of the three-dimensional body encloses the printing region of the three-dimensional body that faces the ink supply apparatus.

* * * * *